Aug. 28, 1923.
A. H. PEYCKE
BRAKE MECHANISM
Filed Nov. 1, 1919
1,466,478
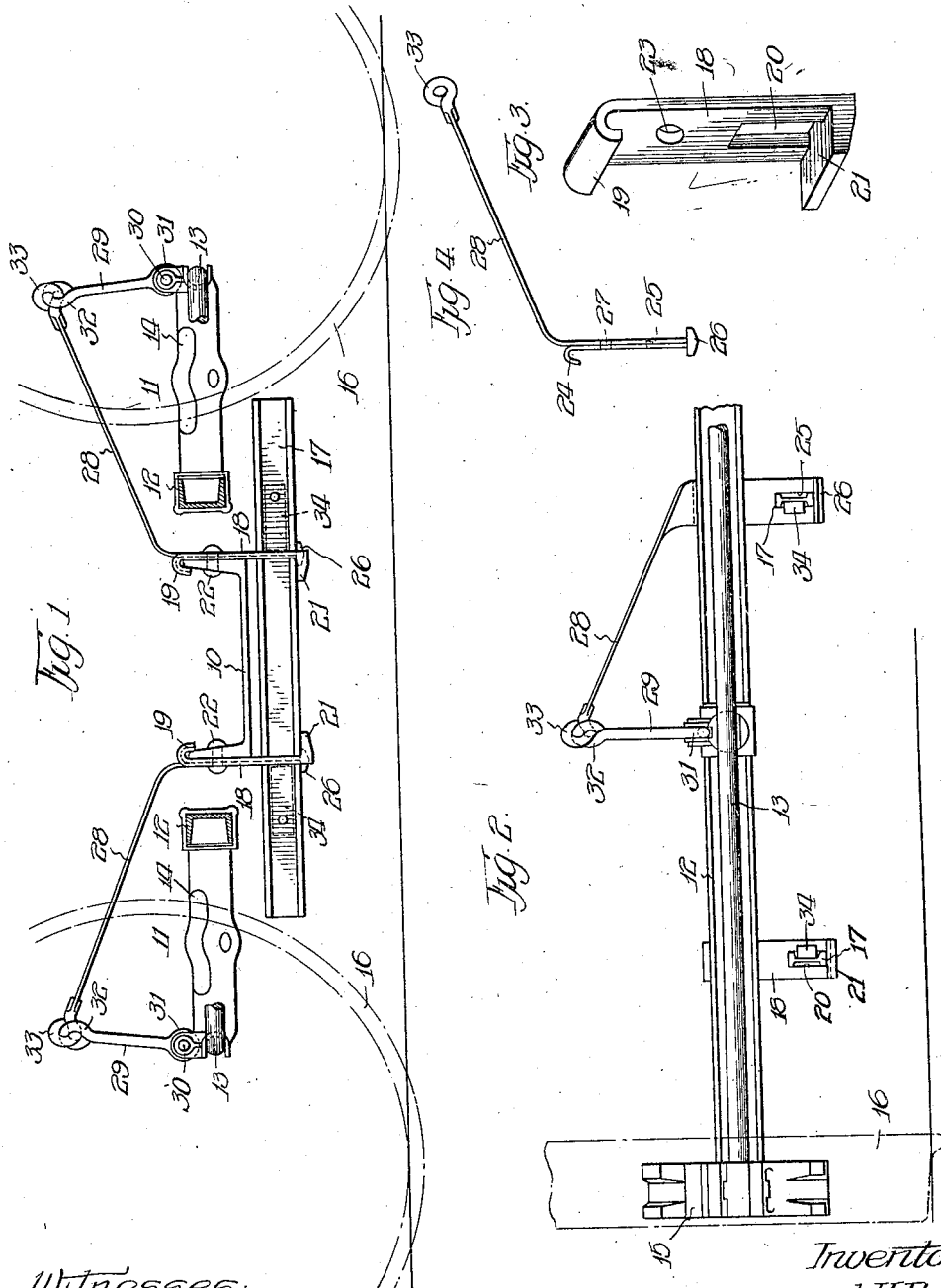
Witnesses:
P. Burkhardt
Chas. L. Byron
Inventor:
Armand H. Peycke,
By Wilkinson & Huxley
Attys Patented Aug. 28, 1923.

1,466,478

UNITED STATES PATENT OFFICE.

ARMAND H. PEYCKE, OF CHICAGO, ILLINOIS, ASSIGNOR TO AMERICAN STEEL FOUNDRIES, OF CHICAGO, ILLINOIS, A CORPORATION OF NEW JERSEY.

BRAKE MECHANISM.

Application filed November 1, 1919. Serial No. 335,058.

*To all whom it may concern:*

Be it known that I, ARMAND H. PEYCKE, a citizen of the United States, residing at Chicago, in the county of Cook and State of Illinois, have invented certain new and useful Improvements in Brake Mechanism, of which the following is a specification.

This invention relates to brake mechanism, and more particularly to means for supporting and leveling brake beams.

The object of this invention is to simplify and improve means for supporting and leveling brake beams in a manner to meet the various requirements for successful commercial operation.

This and other objects are accomplished by means of the arrangement disclosed on the accompanying sheet of drawings, in which—

Figure 1 is a fragmentary side elevation of a railway car truck embodying my invention;

Figure 2 is a fragmentary front elevation of the same arrangement;

Figure 3 is a detail perspective view of a bracket for supporting one of the rigid safety bars; and Figure 4 is a side elevation of the combination bracket and leveling spring.

Referring to the figures of the drawings, it will be noted that I have disclosed my invention in connection with a railway car truck including a spring plank 10 which, as is well known in the art, extends transversely of the truck. Brake beams 11 are provided, the brake beams in this case being of the truss type, each having a compression member 12 and a tension member 13 connected to each other at their ends and spaced apart intermediate their ends at the transverse middle of the brake beam by a fulcrum 14. These brake beams at their ends are provided with brake heads 15 having shoes which engage the braking surfaces of the truck wheels 16 for braking purposes.

Located below the brake beam at each side of the truck is a rigid saftey bar 17 which extends longitudinally of the truck and is supported beneath the spring plank 10. Means for supporting these rigid safety bars in their operative positions takes the form of two different types of bracket members. The left hand bracket member 18, as shown in Figure 2 and shown in perspective in Figure 3, is provided with an upper hook portion 19, which hooks over the associated vertical flange of the spring plank, the lower portion of the bracket having an opening 20 for the reception of the safety bar, the extreme lower portion of the bracket 18 having an offset portion 21 to provide a relatively large seat for the safety bar. The bracket 18 is secured to the spring plank by a rivet or bolt 22, which passes through an opening 23 in the bracket.

The right hand safety guard, as viewed in Figure 2, is supported by a combination bracket and leveling spring, the bracket portion being in the form of a spring doubled back on itself, as shown in Figure 4, the upper end of the bracket being provided with a hook 24 for hooking over the associated vertical flange of the spring plank, said bracket member having an opening 25 for the reception of the rigid safety bar and having at its lower end a head 26 providing a large bearing surface for the safety bar. This bracket member is secured to the spring plank by a suitable rivet or bolt which extends through the opening 27. This supporting bracket terminates in a long spring 28 which extends from a position over a safety bar at one side of the transverse center of the brake beam, said spring extending angularly to the transverse center of the brake beam, where it is connected at 30 by a link 29 to the fulcrum member 14 over the transverse center of the tension member 13. The lower eye 31 of the link 29 extends in a central longitudinal plane with respect to the truck, and the upper eye 32 of the link extends at an angle to accommodate the eye 33 at the upper and outer end of the spring 28. This spring 28 yieldably supports the outer end or tension rod side of the brake beam to maintain the latter in a level position, whereby the brake shoes and braking surfaces of the associated wheel may come into proper operative association when the brakes are set.

By providing the composite bracket and leveling spring having relatively offset portions, the number of single brackets is reduced and the structure simplified. For each truck, two brackets 18, such as shown in Figure 3, are used, and two brackets, such as shown in Figure 4, are used. Lock springs 34 which are secured to the safety bars 17 engage portions of the brackets to prevent accidental displacement of said safety bars.

It is my intention to cover all modifications of the invention falling within the spirit and scope of the following claims.

I claim:

1. In brake mechanism, a spring plank, a combination bracket and leveling spring secured thereto, a safety bar supported by said bracket, and a brake beam, the transverse middle portion of which is supported by the leveling spring which extends transversely of the car from the bracket portion.

2. In brake mechanism, the combination of a brake beam having compression and tension members, a combination bracket and leveling spring secured to a portion of the truck, a safety bar supported by the bracket portion, the leveling spring portion extending transversely of the car from the bracket portion to a point over the transverse center of the tension member, and a connection between said leveling spring and tension member.

Signed at Chicago, Illinois, this 29th day of October, 1919.

ARMAND H. PEYCKE.